(12) United States Patent
Holte

(10) Patent No.: US 9,404,025 B1
(45) Date of Patent: Aug. 2, 2016

(54) WOOD ADHESIVE

(71) Applicant: Hexion Inc., Columbus, OH (US)

(72) Inventor: Ivan E. Holte, Walterville, OR (US)

(73) Assignee: HEXION INC., Columbus, OH (US)

( * ) Notice: Subject to any disclaimer, the term of this patent is extended or adjusted under 35 U.S.C. 154(b) by 8 days.

(21) Appl. No.: 14/256,950

(22) Filed: Apr. 19, 2014

Related U.S. Application Data

(60) Provisional application No. 61/854,730, filed on Apr. 29, 2013.

(51) Int. Cl.
*C09J 161/24* (2006.01)
*C09J 103/00* (2006.01)
*C09J 189/00* (2006.01)

(52) U.S. Cl.
CPC .............. *C09J 161/24* (2013.01); *C09J 103/00* (2013.01); *C09J 189/00* (2013.01)

(58) Field of Classification Search
CPC ....... C09J 189/00; C09J 103/00; C09J 161/24
See application file for complete search history.

(56) References Cited

U.S. PATENT DOCUMENTS

| | | | | |
|---|---|---|---|---|
| 3,907,728 | A * | 9/1975 | Lambuth et al. | 524/34 |
| 4,070,314 | A * | 1/1978 | Alexander et al. | 524/14 |
| 4,496,718 | A * | 1/1985 | Rudy | 536/56 |
| 4,778,530 | A * | 10/1988 | Ayers | 106/164.01 |
| 4,942,191 | A * | 7/1990 | Rogers | 524/17 |
| 5,324,590 | A * | 6/1994 | Nylund et al. | 428/524 |
| 5,952,440 | A * | 9/1999 | Walisser et al. | 525/504 |
| 6,489,392 | B1 * | 12/2002 | Lappalainen et al. | 524/555 |
| 8,293,821 | B1 * | 10/2012 | Tillman | 524/47 |
| 2004/0062920 | A1 * | 4/2004 | Guilbert et al. | 428/295.1 |
| 2005/0070186 | A1 * | 3/2005 | Shoemake et al. | 442/176 |
| 2005/0070635 | A1 * | 3/2005 | Breyer et al. | 524/13 |
| 2005/0250900 | A1 * | 11/2005 | Stofko | 524/594 |
| 2006/0057353 | A1 * | 3/2006 | Motter et al. | 428/297.4 |
| 2006/0128840 | A1 * | 6/2006 | Graux et al. | 524/47 |
| 2007/0020476 | A1 * | 1/2007 | Kintzley et al. | 428/537.1 |
| 2007/0054144 | A1 * | 3/2007 | Dopico et al. | 428/537.1 |
| 2007/0148339 | A1 * | 6/2007 | Wescott et al. | 427/180 |
| 2010/0022687 | A1 * | 1/2010 | Rowland et al. | 524/35 |
| 2010/0069533 | A1 | 3/2010 | Brady et al. | |
| 2010/0279137 | A1 * | 11/2010 | Durkic et al. | 428/528 |
| 2011/0021669 | A1 * | 1/2011 | van Herwijnen et al. | 524/14 |
| 2011/0100256 | A1 * | 5/2011 | Anderson et al. | 106/126.1 |
| 2011/0159768 | A1 | 6/2011 | Crescimanno et al. | |
| 2012/0115992 | A1 * | 5/2012 | Khabbaz et al. | 523/447 |
| 2012/0289628 | A1 * | 11/2012 | Ceulemans et al. | 524/35 |
| 2013/0085211 | A1 * | 4/2013 | Baxter et al. | 524/10 |

FOREIGN PATENT DOCUMENTS

| | | | |
|---|---|---|---|
| GB | 1584387 A | 2/1981 | |
| JP | 58210975 A | * 12/1983 | ................. C09J 3/16 |

OTHER PUBLICATIONS

Machine Translation of JP 58210975 A, 2015.*
Gardner et al., Bonding Flakeboard with Filled and Extended Phenol-formaldehyde Resin, Forest Products Journal, vol. 40 No. 7/8 (1990) pp. 31-36.
El-Wakil et al., Modified Wheat Gluten as a Binder in Particleboard Made from Reed, Journal of Applied Polymer Science, vol. 106, No. 6 (2007) pp. 3592-3599.

* cited by examiner

*Primary Examiner* — Liam J Heincer

(57) ABSTRACT

An adhesive composition for manufacturing a composite wood product comprising an aqueous network of a formaldehyde condensation resin, wheat flour, and wheat gluten, said adhesive composition having a density less than water and is non-thixotropic. The composition is prepared by subjecting an aqueous formaldehyde condensation resin, wheat flour and wheat gluten to an intense high shear.

19 Claims, No Drawings

WOOD ADHESIVE

CROSS-REFERENCE TO RELATED APPLICATIONS

This application claims the benefit of U.S. Provisional Patent Application No. 854,730 filed Apr. 29, 2013, the entire contents of which are hereby incorporated by reference.

BACKGROUND OF THE INVENTION

The present invention relates to a wood adhesive useful in manufacturing composite wood products, and is particularly useful in manufacturing hardwood plywood.

Plywood is manufactured by first applying a thermosetting resin adhesive to the veneers comprising the interior plies with a double roll coater ("spreader"), and forming a panel having the desired panel thickness. Next, a plurality of the panels are stacked into a bundle interspersed alternatively with caul plates, and cold pressed in a pre-press. Finally, the cold pressed panels are pressed at an elevated temperature and pressure in a hot press to cure the thermosetting resin adhesive and bond the inner plies and surface veneer layers in each panel together.

In the manufacture of softwood plywood, which is used primarily for structural and exterior uses, the adhesives currently in use typically employ phenol-formaldehyde resins ("PF" resins). PF resins display excellent processing characteristics and low formaldehyde emissions in these applications, but are not of practical significance in interior applications.

Hardwood plywood is primarily used for interior purposes, such as cabinetry, flooring, and wall paneling. These uses are usually decorative and the appearance of the panel is important. The PF resin adhesives used in manufacturing softwood plywood cannot be used effectively in the manufacture of hardwood plywood. This is because hardwood plywood is manufactured with much thinner surface (decorative) veneers (typically 0.016 inch) and an adhesive made with the dark colored PF resin may bleed through these thin veneers detracting from the decorative quality of the surface.

The resin of choice for adhesives used in manufacturing hardwood plywood has historically been urea formaldehyde resins ("UF" resins) because it is colorless, does not show as much bleed through, and is low in cost. Environmental concerns over the emission of free formaldehyde from hardwood plywood manufactured using UF resins has caused many manufacturers to switch to other adhesives, such as those made from polyamide resins or polyvinyl acetate resins. However, adhesives using the latter resins are much more expensive than adhesives made from UF resins.

Some success has been achieved in developing UF resins that have lower amounts of free formaldehyde by lowering formaldehyde-to-urea molar ratios, adding formaldehyde scavengers, or co-polymerizing urea-formaldehyde with other formaldehyde-reactive materials such as melamine or ammonia. However, these modifications result in formaldehyde emissions that are still higher than is optimally desirable, i.e., substantially zero. They also suffer from other disadvantages overcome by the current invention. These include viscosity instability in the mixed adhesive, viscosity instability in the presence of mechanical shear (as in pumps and on the spreader), poor prepress strength and development rate, poor adhesive bond formation, premature dry-out on spread veneers, high spread requirements, poor tolerance to normal moisture variations in the plywood manufacturing process, slower cure in the hot press, and higher costs. Some of these deficiencies were less problematic with the older, high free formaldehyde resins. However, the older technology is no longer environmentally acceptable and would result in plywood that could not comply with current statutes regulating formaldehyde emission.

The wood adhesive of the present invention allows the use of the most advanced low emitting formaldehyde UF resin technology available while overcoming all of the inherent problems associated therewith discussed above. In addition, the wood adhesive of the present invention provides a significant reduction in formaldehyde emissions from said low emitting formaldehyde UF technology by providing formaldehyde emission values of substantially zero when measured by the standard tests accepted by regulatory agencies.

SUMMARY OF THE INVENTION

It is an object of the present invention to provide a wood adhesive for manufacturing composite wood products such as hardwood plywood that overcomes the prepressing and hot-press bonding problems that are often seen when using low-formaldehyde UF resin-based adhesives. The invention provides these improved properties at levels exceeding those available before. In addition, a serendipitous reduction in formaldehyde emissions from finished panels glued with the invention is beyond expectation and better than provided by pre-existing low formaldehyde technologies.

It is a further object of this invention to provide said adhesive with significantly improved rheological properties when interacting with pumps and spreaders, wider assembly time windows, and process moisture and temperature tolerance. All of this is accomplished at a cost savings resulting from lower adhesive spread requirements when compared to currently available adhesive mixes made with standard techniques and low formaldehyde-emitting UF resin technology. Experience to date indicates that spread reductions of about 15% to about 20% are available through use of this invention.

The surprising reduction in mixed adhesive density of the present invention (less than about 8.0 lbs./gallon versus the typical prior art density of about 10.0 lbs./gallon) provides spread reductions (amount of glue used) and improved spread control. It is important to note that the properly prepared adhesive of the present invention floats on water, i.e., had a density less than water, but is not foamy.

In addition, the viscosity and structural stability of the mixes of the present invention, which are not thixotropic when exposed to catalyzed pot life and mechanical shear, eliminated the frequent adjustments of adhesive application rates normally associated over time on the spreader as seen with conventional prior art adhesives which are thixotropic and thin out over time. Even newer improved low formaldehyde adhesives available in the prior art also often display excessive initial shear thinning in pumps and on spreaders due to resin thixotropy.

Prior art adhesives are subject to separation of the wheat flour that is simply suspended in the adhesive. Wheat flour settling characteristic of prior art adhesives lead to spreader buildup, poor spread control, loss of prepress strength, over-penetration of adhesive, bleed-through, and poor bonding and adhesive degradation in hot-pressed panels.

The present invention greatly moderates these thixotropy-related fluctuations by providing an adhesive that is substantially non-thixotropic, i.e., has a thixotropic index of substantially 1.0.

Other problems seen with previous adhesive technologies aimed a overcoming the shear thinning and prepress problems mentioned, especially those modifications containing gluten isolates, include excessive drying on the spreader, and polymerization-related loss of pot-life associated with uncontrolled viscosity increases in acidified UF resin adhesives. These unwanted changes required frequent trial-and-error spreader adjustments made on the fly during production. Such adjustments often led to periods of unnecessary high glue use and product or grade loss. When glue is spread too high, it tends to over-penetrate and produce weak bonds. High spreads also cause bleed though, bond degradation and delamination after the hot press and high formaldehyde emissions. High spreads also require longer prepressing times to develop sufficient uncured veneer consolidation to prevent veneer fold-backs and delaminations during transfer into the hot press from the prepress. Long prepressing times slow production. It is not unusual, during cool weather, to see a hot-press sit empty because the prepress strength of the stacked green panels had not developed sufficiently to permit transfer.

It is a still further object of this invention to provide an adhesive that reduces mill down time, adhesive waste, environmental impact, and cleanup costs by reducing dry-out and buildup on adhesive spreaders, mixers, pumps, and other mill equipment. With the adhesive of the present invention wash down requirements are reduced by about one-third in comparison to current urea-formaldehyde technology.

DESCRIPTION OF PREFERRED EMBODIMENTS

The wood adhesive of the present invention is comprised of an aqueous formaldehyde condensation resin and protein network. It is formed through addition of wheat flour, or a combination of wheat flour and wheat gluten, into a highly concentrated aqueous formaldehyde resin subjected to an intensely high mixing energy. The aqueous formaldehyde resin is preferably a UF resin of a similar UF resin product that may contain co-monomers such as melamine, ammonia, or other amine. The mixing energy required for formation of these networks far exceeds normal wood adhesive mixing practice or historical mixing experience in the plywood industry, and is sufficient to extract a large amount of wheat gluten from the wheat flour. These networks display unique and unexpected rheology and stability that appears to be independent of the changes normally taking place in the UF resin during its working life. The network appears to inhibit transfer of moisture either into or out of the glue line during processing.

Unlike conventional UF glues for hardwood plywood, the glue of the present invention is not water-soluble. It does not easily disperse in water when stirred. When added to water it floats on top, i.e., has a density less than water, whereas a conventional glue of the prior art would be heavier than water and would sink in the water. Prior art adhesives would also disperse fairly easily in the water when stirring is applied.

Furthermore, the glue of this invention has a much lighter color (white) than prior art glue (yellow) of the same proportions of resin and wheat flour. It is believed the color difference is due to increased light scattering that results from the combination of resin oligomers and proteins to form the adhesive network. The low density, stable viscosity under shear, light color, and unwillingness to accept water are key characteristics of a wood adhesive made in accordance with the teachings of the present invention.

Wheat gluten is an important component of the adhesive of the present invention, and its effects are obtained though intense mechanical energy acting to either develop the gluten naturally available in the wheat flour or by direct addition of additional wheat gluten during the intense high shear mixing phase of the process of the present invention. Although wheat gluten has been sometimes used as a component in prior art wood adhesives, such use has not resulted in the properties achieved in the present invention due to the absence of intense high shear during preparation of the adhesive. It is believed that the intense mechanical shear required for preparation of the wood adhesive of the present invention facilitates molecular alignment of the gluten proteins, resin oligonomer amide structures, and other proteins from the wheat flour by simultaneously providing directional forces and sufficient energy to denature the natural protein structure. It also seems likely that the presence of a "seed" amount of pre-extracted gluten (gluten isolates) enhances formation of the desired laminar gluten-resin network by providing a starting point for the alignment of gluten subsequently extracted from the wheat flour by the high intensity shear forces to which it is subjected, as one might see in ordinary crystal formation.

It has been observed that the movement of the adhesive when mixed in accordance with the intense high shear process of the present invention is more of a rolling or folding process than the turbulent flow seen in prior art mixes. This high level of organization is not made available through low shear prior art mixing practices due to application of insufficient energy and insufficient resin and protein concentration during the critical phase of network development. Nor can it be attained by simply providing thermal energy, which would result in a random agglomerate.

To amplify previous statements, conventional UF resin adhesive mixes are subject to excessive dry out due to the separation of the wheat flour (sometimes called "filtering") in the spreader and in the glue line after it is spread on the veneer. When this occurs in the corners of a spreader, which receive little agitation during the process, it results in buildup and causes cleanup proems on the equipment. When it occurs on the spread glue line, it results in separation of water and resin from the glue line, which, in turn, results in poor glue flow and poor bonding in the hot press. The adhesive of his invention does not suffer from filtering problems. There is no separation of flour particles from the adhesive liquid. Furthermore, the tensile strength of the adhesive prevents formation of non-flowing dead areas and resultant deposits from forming on the spreaders.

Intense high energy mixing is required in the presence of gluten to attain the performance advantages of the current invention. We have observed that this energy may be supplied in the form of mechanical shear to an aqueous UF resin-flour mixture of sufficiently high solids to permit transmission of the energy to the UF resin, flour and gluten components. We believe that these conditions enable formation of an intimate aligned gluten-resin network capable of maintaining coherence and structure, retaining moisture, providing superior rheology, and trapping gaseous formaldehyde emissions during the plywood manufacturing process.

Free water is not present in the adhesive components during the initial high intensity mixing process must be kept to a minimum to prevent dissipation of mixing energy into counter-productive entropic agitation and energy absorption of the water. In the preferred process, only the water present in the aqueous formaldehyde resin component is present in the initial mixing phase. No additional water is added. To add such water would adversely affect formation of the critical network by dissipating energy, creating turbulence, and disrupting lamina flow. Attrition to a colloidal dispersion of wheat particles suspended in water, incomplete gluten extraction, and undesirable flour filtering will follow.

Some water may be added to the mix at the end of the mixing process (after the intense high shear alignment is complete and the resin-protein network has been fully formed) for viscosity control or to obtain other desirable effects without deleterious consequences, as long as sufficient mixing power is available to disperse the water in the adhesive matrix. The water content of the mixture during the initial high intensity mixing process must be kept to a minimum to prevent dissipation of mixing energy into counter-productive entropic agitation and energy absorption of the water.

The importance of intense high shear was observed during a mill trial of the present invention when the power supplied to the mixer was reduced by about 30%. This power level was still nearly double that normally provided to prior art mixes but still resulted in drastically reduced performance of the resulting adhesive.

The importance of gluten was tested by using wheat flour that was naturally lower in gluten. Again lost performance was noted, even though the seed gluten was present. This demonstrates that gluten developed from the wheat flour during intense high shear mixing makes a significant contribution. While it is possible to add more wheat gluten (wheat gluten isolates) to the mix, this source is far more expensive than combining what gluten obtained by intense high shear in-situ extraction from the wheat flour with wheat gluten isolates. It would be highly desirable to obtain sufficient wheat gluten from the wheat flour alone if wheat flour of adequate wheat gluten content could be obtained, and it is within the scope of the present invention to use such high wheat gluten flour alone as well as use of wheat flour in combination with added wheat gluten isolates.

Given sufficiently powerful and capable mixers, the possibility that the use of UF resins still higher in solids than those described herein (about 60% by weight) could lead to further improvements in performance, though such materials are not currently available.

The mixes of the present invention enable about 12% to 20% lower effective adhesive application compared to previous adhesives and an increase in production of almost 20% See Table 1.

TABLE 1

ADHESIVE USAGE: INVENTION VERSUS PRIOR ART

| Time Period | Adhesive | Average Glue Used, Lb/MDGL |
| --- | --- | --- |
| January - December 2012 | Prior Art | 87 |
| April - August 2013 | Invention | 75 |

Note: The average monthly core line footage for the prior art plywood manufacturing was 12,936,197. The average monthly core line footage for the invention plywood manufacturing was 15,356,953, an average monthly increase in production of 2,420,756 per month.

It is believed that the unanticipated reduction in formaldehyde emissions, beyond that attributable to the low emitting UF resin technology, may be related to formation of the UF resin-gluten network. Those skilled in the art are aware of the potential for reaction between free formaldehyde and the protein and, to a lesser extent, the starch in wheat flour. This reaction could easily account for differences in emissions between UF resin adhesive mixtures containing wheat flour versus those not containing wheat flour. However, in the case of UF adhesive mixes for hardwood plywood manufacture, both the adhesive of the present invention and the conventional prior art adhesives contain the same amount of wheat flour and the same amount of UF resin. Thus, based on material balance, both mixes should have the same reaction potential for combination of flour proteins and formaldehyde, and therefore the same formaldehyde scavenging ability and emissions. This is not what was observed. Table 2 clearly shows that the adhesive of the present invention produced lower formaldehyde emissions than the prior art adhesive and departs from expectations based on material balance.

Table 2 shows formaldehyde emissions from panels made from the adhesive of this invention from April through June, 2013 were compared to those of similar panels made in the same mill with the conventional adhesive of the same composition from January through March of 2013 by the Large Scale Chamber Test. The conventional adhesive showed 0.007 ppm (3 tests) on average while the adhesive of the invention averaged 0.000 ppm (7 tests). When tested by a Small-Scale laboratory test method conducted on samples of freshly pressed panels, formaldehyde emissions were reduced by 80% by use of the adhesive of the invention during the same six-month period.

On the surface, one might expect lower formaldehyde emissions simply on the basis of reduced adhesive usage. However spreads are lowered by about 15% while emissions drop by between about 80% to about 100%. It is believed that the observed low adhesive density and the dry-out resistance attributes of the adhesive account for much of the reduction in formaldehyde emissions. This is due to the physical nature of the resin-protein network formed during the mixing process and its ability to retain moisture and other gases.

TABLE 2

PRODUCTION FORMALDEHYDE COMPARISONS
FIRST SIX MONTHS 2013

| Date Manufactured | Date Tested | Thickness Inches | Adhesive | Small-Scale HCHO | Large Chamber HCHO |
| --- | --- | --- | --- | --- | --- |
| Jan. 15, 2013 | Jan. 24, 2013 | ½ | Prior Art | 0.039 | 0.003 |
| Mar. 11, 2013 | Mar. 11, 2013 | ¾ | Prior Art | 0.055 | 0.015 |
| Mar. 25, 2013 | Mar. 25, 2013 | ¾ | Prior Art | 0.038 | 0.002 |
|  |  |  | Average | 0.044 | 0.007 |
| Apr. 13, 2013 | May 10, 2013 | ½ | Invention | 0.000 | 0.000 |
| Apr. 17, 2013 | May 10, 2013 | ½ | Invention | 0.000 | 0.000 |
| May 10, 2013 | May 16, 2013 | ¾ | Invention | 0.032 | −0.002 |
| May 17, 2013 | May 21, 2013 | ¾ | Invention | 0.003 | 0.000 |
| May 22, 2013 | May 30, 2013 | ½ | Invention | 0.008 | 0.000 |
| Jun. 18, 2013 | Jun. 25, 2013 | ½ | Invention | 0.009 | 0.000 |
| Jun. 18, 2013 | May 25, 2013 | ¾ | Invention | 0.008 | 0.000 |
|  |  |  | Average | 0.009 | 0.000 |

The "Small-Scale HCHO" test is the small-scale chamber test described in ASTM D 6007. The "Large Chamber HCHO" test is the large-scale chamber test described in ASTM E 1333.

It is believed that this reduction in formaldehyde emissions may be explainable by a combination of factors inherent in the process.

First, the premixing of the UF resin, wheat gluten, and wheat flour without addition of water leads to an intimate aligned network between resin and flour proteins (including gluten). This intimacy is the reaction surface equivalent to a greater protein concentration and would lead to greater reaction potential between formaldehyde released from the resin and the amide- and amine-functionalities found in the proteins. The observed low water affinity of the adhesive network suggest that water is partially excluded from the network, leading to a lower energy reaction path for formaldehyde-protein amino-group reaction and greater effective reaction concentration within the matrix.

Second, the resin-protein network might act as a physical barrier to formaldehyde release thus providing more reaction time for the protein and formaldehyde to react before the formaldehyde finds escape into surrounding moisture or the atmosphere.

Third, in the standard prior art mixing process, dispersion of the flour into the water, away from the UF resin polymer, makes protein unavailable to the formaldehyde due to both increased distance separating reactants and to the layers of water surrounding independently suspended flour particles which increase kinetic energy requirements for attaining reaction.

Finally, formaldehyde trapped in the protein-resin matrix is less subject to hydrolytic extraction by moisture in the cured panel due to the low water tolerance of the adhesive and its tendency to repel water.

Comparing the density of conventional mixes with those of the current invention provides evidence of the ability of mixes of the current invention to trap gasses. Several such comparisons show that the invention produces adhesives with approximately 17-20% lower density when made with relatively high gluten flours (Table 3).

TABLE 3

| Property | Low Gluten | High Gluten |
| --- | --- | --- |
| Color | Cream yellow | White |
| Viscosity | 6,400 cps | 6,400 cps |
| Shear Viscosity | 4,300 cps | 6,400 cps |
| Density | 9.4 pounds/gallon | 7.98 pounds/gallon |

"Viscosity" was measured on the adhesive fresh out of the mixer.

"Shear Viscosity" was measured on the adhesive after it had circulated to the spreader and had been subjected to the shear caused by pumping.

It can be seen that the low gluten adhesive was thixotropic, having a thixotropic index of almost 1.5. It can also be seen that the high gluten adhesive was not thixotropic, having a thixotropic index of 1.0.

When a mix was made using the process of the current invention, but substituting a lower protein (and lower gluten) wheat flour the mix density was reduced by only 6% against a conventional mix made with high gluten flour, thus demonstrating that high gluten and intense high shear energy, properly applied, are both important components of the invention.

The UF resin employed in the adhesive of the present invention is preferably one that has lower free formaldehyde than is present in the older UF resin technologies. One such lower free formaldehyde UF resin is manufactured and sold by Momentive Specialty Chemicals, Inc. Under the trademark ULEF-600-04. This resin is supplied as an aqueous solution having a solids content of 60% by weight, and a formaldehyde-to-urea ratio of 1.54-to-1.00. The amount of the aqueous UF resin used in the adhesive of the present invention is preferably about 50% by weight of the mix.

The wheat flour used in the adhesive of the present invention can be any of those brands used in making UF resin adhesives for the hardwood plywood industry though those with high protein and high gluten content are preferred. Wheat flour high in gluten content is sometimes called "hard" flour, and has a protein content of between about 12% and about 15% by weight. Wheat flour low in gluten content is sometimes called "soft" flour, and has a protein content of between about 7.5% and about 9.0% by weight. The amount of wheat flour used in the adhesive mix is preferably between about 23% and about 30% by weight of the mix.

When gluten isolate is added separately, a suitable amount may be between about 0.003 to about 0.006% of the weight of the mix. Since the mixes of the present invention contain wheat flour, which is also the major source of gluten developed under the intense high-energy mixing conditions of the present invention, they do not strictly require separate addition of gluten, though gluten may be used to enhance certain desirable properties. However, adhesive mixes relying on low protein wheat flours will probably require it. It may not be possible to add sufficient gluten isolate to attain the desired performance when using non-glutenous cereal flours.

In order to form a stable, homogeneous adhesive, the UF resin, wheat flour, and optional gluten isolate must be subjected to much higher shear (intense high shear) during blending than the shear employed in forming prior art hardwood adhesive suspensions The intense high shear should be sufficient to form a stable network of wheat flour, wheat gluten, and resin in the aqueous adhesive composition which is evidenced by a resulting adhesive having a density lower than that of water and is non-thixotropic (has a thixotropic index of substantially 1.0). Evidence of this transition may be the development of a lighter color and a uniform, stable reduction in mix density, a reduction in water solubility, and the stringy nature that develops during initial mixing.

One measure of shear energy input is the ratio of the horsepower of the mixer motor to the volume of the material subjected to the shear. The preferred horsepower to volume ratio used in forming the adhesive composition of the current invention is about 0.4 horsepower per gallon, about three times the power supplied to conventional prior art UF resin adhesive mixes. This is applied for about 6 to 8 minutes. The full amperage capability of the motor is preferably utilized.

Conventional UF catalysts and acidifying agents in conventional amounts are also used in making the adhesive of the present invention.

Although the wood adhesive described herein preferably includes UF resin, other formaldehyde condensation resins can be used to form an adhesive with lower free formaldehyde emissions. Such other formaldehyde condensation resins include phenol-formaldehyde resins, melamine-formaldehyde resins, and any mixtures hereof with one another or with UF resins. Such adhesives can be used in forming composite wood products such as softwood plywood, oriented strand board, chipboard, hardboard, particleboard, fiberboard, and laminated veneer lumber (LVL).

The following example describes the preparation of the adhesive composition of the present invention.

Example 1

The mixer used in preparing the adhesive of the present invention was a 200-gallon stainless steel tank equipped with a single, multiple-vaned mixer blade manufactured by Holte Manufacturing of Veneta, Oreg. The mixer blade was centrally positioned within the tank about 20 inches from the bottom. The mixer blade was attached to a vertical drive shaft driven by a 75 horsepower motor drawing 95 amperes. The velocity at the circumference of the blade was 6,300 fpm. The following ingredients were added one at a time in the order and amounted noted. All of the flour would have been added at the front had sufficient mixing power been available. The essential mixing is done before water is added at the end for viscosity adjustment. The mixer blade was actuated after the addition of the UF resin.

TABLE 4

| Ingredient | Order of Addition | % by weight of mix |
| --- | --- | --- |
| UF Resin | 1 | 55 |
| Wheat Gluten | 2 | 0.005 |
| Wheat Flour | 3 | 15 |
| Catalyst/acid | 4 | Small amount |
| Wheat Flour | 5 | 5 |
| Water | 6 | 25 |

The aqueous UF resin solution was supplied by Momentive Specialty Chemicals, Inc. Under the trademark ULEF-600-04. The wheat gluten was supplied by Commodities Plus. The wheat flour was a hard wheat flour supplied by Commodities Plus under the trademark 395. The entire mixing cycle lasted about 8 minutes. The viscosity of the resulting aqueous adhesive was 6,400 cps. The density of the resulting aqueous adhesive was 7.98 pounds per gallon, about 20% lower than the density of 10.0 pounds per gallon typically found with prior art adhesives made from an aqueous suspension of wheat flour in a UF adhesive.

The following comparative Example 1A shows the preparation of a typical prior art UF resin adhesive that would be used in making hardwood plywood.

Comparative Example 1A

Although the mixer used in preparing a typical prior art UF resin adhesive for making hardwood plywood would normally have a much lower shear than that used in preparing the UF resin adhesive of the present invention as described in Example 1, the mixer used in Example 1 was also used in this Comparative Example 1A to show the importance of the sequence of addition in preparing the adhesive of the present invention. The resin and wheat flour were the same as used in Example 1.

TABLE 4A

| Ingredient | Order of Addition | % by weight of the mix |
| --- | --- | --- |
| Water | 1 | 25 |
| Catalyst/acid | 2 | Small amount |
| Part of resin | 3 | 30 |
| Wheat flour | 4 | 25 |
| Remainder of resin | 5 | 20 |

Table 5 compares various properties of the adhesive of Example 0.1 with the standard, prior art UF adhesive of Comparative Example 1A.

TABLE 5

| Property | Comparative Example 1A Adhesive | Example 1 Adhesive |
| --- | --- | --- |
| Color | Cream yellow | White |
| Viscosity | 7,000 cps | 6,500 to 8,000 cps |
| Shear Viscosity | 3 to 4,000 cps | 6,500 to 8,000 cps |
| Density | 10.2 pounds/gallon | 7.98 pounds/gallon |

Example 2

The adhesive prepared in Example 1 was supplied to interior plies of white fir in a spreader at the rate of about 65 pounds/MDGL (one thousand square feet double glue line) of adhesive. (Prior art adhesives prepared with UF resins, such as that described in Comparative Example 1A, are applied at a minimum rate of about 80-87 pounds/MDGL.) Maple veneers having thickness of 0.016 inch were applied to both surfaces of the five interior plies, prepressed, and hot pressed. The bond strength of the resulting seven ply, ¾ inch hardwood plywood panels was superior to those obtained using prior art UF adhesives, such as that described in Comparative Example 1A. The amount of free formaldehyde of the panels was 30% to 40% less than the free formaldehyde exhibited by the prior art UF adhesives, such as that described in Comparative Example 1A, and was substantially 0.0.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A blended adhesive composition for manufacturing a composite wood product comprising an aqueous network of:
    a formaldehyde condensation resin,
    wheat flour, and
    wheat gluten, said adhesive composition having a density less than water, wherein the wheat flour comprises a pre-extracted gluten content from 7.5 wt. % to 15 wt. %, and wherein the wheat flour has been exposed to a shear extraction process in the presence of the formaldehyde condensation resin in the absence of additional water.

2. The adhesive composition of claim 1 wherein said formaldehyde condensation resin is urea-formaldehyde.

3. The adhesive composition of claim 2 wherein said composite wood product is hardwood plywood.

4. The adhesive composition of claim 1 wherein said wheat gluten was shear extracted from said wheat flour during manufacture of said adhesive composition.

5. The adhesive composition of claim 1 wherein the wheat gluten comprises shear extracted wheat gluten from said wheat flour and wheat gluten isolates.

6. The adhesive composition of claim 1 wherein said adhesive composition is non-thixotopic.

7. The adhesive composition of claim 1 wherein said adhesive composition has a density of between about 7.90 and about 8.00 pounds per US gallon.

8. The adhesive composition of claim 7 wherein said adhesive composition has a density of about 7.98 pounds per US gallon.

9. A blended adhesive composition for manufacturing hardwood plywood comprising an aqueous network of a urea-formaldehyde condensation resin, wheat flour, and wheat gluten, said adhesive composition having a density of between about 7.90 and 8.00 pounds per US gallon and a thixotropic index of substantially 1.0, wherein the wheat flour comprises a gluten content from 7.5 wt % to 15 wt. %, and wherein the wheat flour has been exposed to a shear extraction process in the presence of the formaldehyde condensation resin in the absence of additional water.

10. The process of preparing an adhesive for composite wood products comprising:
    providing an aqueous formaldehyde condensation resin;
    subjecting said resin to an intensely high shear;
    adding wheat flour having a pre-extracted gluten content of 7.5 wt. % to 15 wt. % to said resin under said intense high shear in the absence of additional water, said intense high shear being sufficient to extract wheat gluten from said wheat flour;
    adding water to said resin, wheat flour and wheat gluten under said intense high shear in an amount sufficient to provide an adhesive composition having a viscosity suitable for preparing a selected composite wood product; and subjecting said resin, wheat flour, wheat gluten and water to said intense high shear for a time sufficient to form an adhesive composition having a density less than water.

11. The process of claim 10 wherein wheat gluten isolates are added prior to water addition in an amount that raises the total wheat gluten content to a level that allows the composition to achieve said density less than water.

12. The process of claim 10 wherein said resin is a urea-formaldehyde resin.

13. The process of claim 12 wherein said aqueous urea-formaldehyde resin has a solids content of about 60%.

14. The process of claim 12 wherein said composite wood product is hardwood plywood.

15. The process of claim 10 wherein the amount of water added to the adhesive composition does not exceed about 25% by weight of the final adhesive composition.

16. The process of claim 10 wherein said adhesive composition has a density of between about 7.90 and about 8.00 pounds per US gallon.

17. The process of claim 16 wherein said adhesive composition has a density of about 7.98 pounds per US gallon.

18. The process of preparing an adhesive composition for composite wood products comprising:

providing an aqueous urea-formaldehyde condensation resin;

subjecting said resin to an intense high shear;

adding wheat flour having a pre-extracted gluten content of 7.5 wt. % to 15 wt. % to said resin under said intense high shear in the absence of additional water, said intense high shear being sufficient to extract wheat gluten from said wheat flour;

adding water to said resin, wheat flour and wheat gluten under said high shear in an amount up to about 25% by weight of said adhesive composition; and subjecting said resin, wheat flour, wheat gluten and water to said intense high shear for a time sufficient to form an adhesive composition having a density less than water and is non-thixotropic.

19. The process of claim 18 wherein said aqueous urea-formaldehyde resin has a solids content of about 60% by weight.

\* \* \* \* \*